US006960328B2

(12) United States Patent
Bortun et al.

(10) Patent No.: US 6,960,328 B2
(45) Date of Patent: Nov. 1, 2005

(54) ZIRCONIUM PHOSPHATE AND METHOD OF MAKING SAME

(75) Inventors: Anatoly I. Bortun, Easton, PA (US); Clive J. Butler, Easton, PA (US)

(73) Assignee: Magnesium Elektron, Inc., Flemington, NJ (US)

( * ) Notice: Subject to any disclaimer, the term of this patent is extended or adjusted under 35 U.S.C. 154(b) by 325 days.

(21) Appl. No.: 10/195,630

(22) Filed: Jul. 15, 2002

(65) Prior Publication Data

US 2004/0009110 A1 Jan. 15, 2004

(51) Int. Cl.[7] .......................... C01B 25/37; B01J 27/16; B01J 27/18
(52) U.S. Cl. ...................... 423/139; 210/681; 210/688; 423/306; 423/308; 423/309; 502/208
(58) Field of Search .................. 423/306, 308, 423/309, 311, 139; 502/208; 210/688, 681

(56) References Cited

U.S. PATENT DOCUMENTS

| | | | |
|---|---|---|---|
| 2,349,243 A | 5/1944 | Bates | |
| 3,056,647 A | 10/1962 | Amphlett | |
| 3,130,147 A | 4/1964 | Dwyer | |
| 3,416,884 A | 12/1968 | Stynes | |
| 3,485,763 A | 12/1969 | Lefevre et al. | |
| 4,025,608 A | 5/1977 | Tawil et al. | |
| 4,381,289 A | * 4/1983 | Nowell et al. | 423/311 |
| 4,512,905 A | 4/1985 | Clearfield et al. | |
| 4,526,765 A | 7/1985 | Ito et al. | |
| 4,695,642 A | 9/1987 | Derouane et al. | |
| 4,806,517 A | 2/1989 | Vanderpool et al. | |
| 4,826,663 A | 5/1989 | Alberti et al. | |
| 5,072,031 A | * 12/1991 | Hellring | 423/309 |
| 6,077,809 A | 6/2000 | Suzuki et al. | |
| 6,326,328 B1 | 12/2001 | Matsuzawa | |
| 6,379,641 B1 | 4/2002 | Bedard et al. | |
| 6,391,278 B1 | 5/2002 | Pinavaia et al. | |
| 2003/0103888 A1 | * 6/2003 | Hai et al. | |

FOREIGN PATENT DOCUMENTS

| | | |
|---|---|---|
| FR | 1317359 | 3/1963 |
| JP | 62-226807 | * 10/1987 |
| JP | 5-17112 | * 1/1993 |

OTHER PUBLICATIONS

International Search Report, dated Oct. 2, 2003.
Amphlett, C.B., *Inorganic Ion Exchangers*, Elsevier Publishing Company, New York, (1964), pp. 92–95 (no month).
V.V. Streklo, Abstract Translation of *attached Russian article for Chemistry Role in the Environmental Protection*, Naukova Dumka, Kiev (1982) pp. 179–188. (no month).
*Synthetic Inorganic Ion Exchangers*, Vesely, V. and Pekarek, V, Talanta 1972, vol. 19, pp. 219–262. (no month).
*On the Synthesis of a–Zirconium Phosphate*, Trobajo, Camino et al., Chem. Mater, 2000, vol. 12, pp. 1787–1790. ( no month).
*Galvanic Cell Type Humidity Sensor with NASICON–Based Material Operative at High Temperature*, Feng et al., Chem. Mater, 1992, vol. 4, pp. 1257–1262. (no month).
*Crystalline insoluble salts of polybasic metals–II. Synthesis of crystalline zirconium or titanium phosphate by direct precipitation*, G, Alberti et al., J. Inorg. Chem., vol. 30, pp. 317–318, 1968. (no month).

(Continued)

Primary Examiner—Wayne A. Langel
(74) Attorney, Agent, or Firm—Pearne & Gordon LLP

(57) ABSTRACT

A zirconium phosphate compound having a Zr:P ratio of from about 1.80–2.0 to 1, which compound's H-form exhibits a single peak at −13.7±0.5 ppm in the $^{31}P$ NMR spectra. The compound is useful as a catalyst, catalyst support and ion exchange media having a high affinity for cobalt and nickel ions.

38 Claims, 4 Drawing Sheets

OTHER PUBLICATIONS

*P MAS NMR Investigations of Crystalline and Glassy NASI-CON—Type Phosphates*, K.C. Sobha et al., Journal of Solid State Chemistry, vol. 121, pp. 197–201 (1996). (no month).
*Structure of Zirconium phosphate gels produced by the sol–gel method*, S.G. Bogdanov et al., J. Phys.: Codens, Matter 9 (1997), pp. 4031–4039, (no month).
*The effect of mineralizers on the crystallization of zirconia gel under hydrothermal conditions*, G Dell'Agli et al., Solid State Ionics 123 (1999) pp. 87–94. . (no month).
*Preparation of stable, high surface area zirconia*, K.S. Chen et al., J. Mat. Science, 12, N21, 1579–1581 (1994) (no month).
*Scientific Bases for the Synthesis of Highly Dispersed Framework Zirconium Phosphate Catalysts for Paraffin Isomerization and Selective Oxidation*, Sadykov et al., Kinetics and Catalysis, vol. 42, No. 3 (2001), pp. 391–398. (no month).
*Preparation and Sorption Properties of Spherical Polyacrylamide–Zirconium Phosphate Ion– Exchanger*, Chao–Yeuh Yang et al., Separation Science and Technology, 18(1), pp. 83–91, 1983. (no month).
*Sol–gel preparation of nanostructured adsorbents*, Y.S. Lin and S.G. Deng, Adsorption and its Application in Industry and Environmental Protection Studies in Surface Scienca and Catalysts, vol. 120, pp. 653–686, 1998, (no month).
Ion Exchange Properties of Tin (IV) Materials—1 Hydrous TIN(IV) Oxide and its Cation Exchange Properties. Donaldson and M.J. Fuller, J. inorg. nucl. Chem., 1968, vol. 30, pp. 1083–1092. (no month).
*Preparation and characterisation of mesoporous, high–surface–area zirconium (IV)oxide*, Michael J. Hudson and James A. Knowles, J. Mater. Chem., 1996, 6(1), pp. 89–95. (no month).
*Parameter control in the synthesis of ordered porous zirconium oxide*, Han–Rong Chen et al., Materials Letters 51 (Nov. 2001), pp. 187–193.
*Preparation of zirconia powder by the pyrolysis of active carbon*, M. Ozawa and M. Kimura, Journal of Material Science Letters 9 (1990) pp. 446–448. (no month).
*Effects of Chemical Species on the Crystallization Behavior of a Sol–Derived Zirconia Precursor*, C.L. Ong et al., J. Am. Ceram. Soc. 81 (10), pp. 2624–2628 (1998). (no month).
*Morphology of Zirconia Synthesized Hydrothermally from Zirconium Oxychloride*, Bruno Mottet, et al.., J. Am. Ceram. Soc. 75 (9), pp. 2515–19 (1992). (no month).
*Microwave–Hydrothermal Synthesis of Nanocrystalline Zirconia Powders*, Federica Bondioli et al., J. Am. Ceram. Soc., 84(11), pp. 2728–2730 (2001). (no month).
*Highly Ordered Porous Zirconias from Surfactant–Controlled Synthesis: Zirconium Oxide–Sulfate and Zirconium Oxo Phosphate*, Ulrike Ciesla et al., Chem. Mater, 1999, vol. 11, No. 2, pp. 227–234. (no month).
*Inorganic Ion Exchange Materials Group IV Hydrous Oxides–Synthetic Inorganic Ion Exchangers, Chapter 5*, Abraham Clearfield, Ph.D, Ed., CRC Press, Inc., 1982, pp. 141–160. (no month).
*The Preparation of Crystalline Zirconium Phosphate and Some Observations on its Ion Exchange Behaviour*, A. Clearfield and J.A. Stynes, J. Inorg. Nucl. Chem., vol. 26, 1964, pp. 117–129. (no month).
*New Crystalline Phases of Zirconium Phosphate Possessing Ion–Exchange Properties*, A. Clearfield et al., J. Inorg. *Nucl. Chem., 1968*, vol. 30, , pp. 2249–2258. (no month).

*Uptake of Inorganic Acids on Hydrogels on Tetravalent Hydroxides and its Application for the Preparation of Some Inorganic Sorbents*, R. Caletka et al., Journal of Radioanalytical Chemistry, vol. 30 (1976), pp. 155–172. (no month).
*Synthesis and Study of New Compounds $(M^1)(N^v)_2(PO_4)_3$ with Nasicon–Like Structure* (M=AG. Cu; N=Ge H, Sn, Ti, Zr), (no date), J.M. Winand et al., Journal of Solid State Chemistry 107, (1993), pp. 356–361. (no month).
*Preparation of Porous Resin Loaded with Crystalline Hydrous Zirconium Oxide and its Application to the Removal of Arsenic*, T. M. Suzuki et al., Reactive & Functional Polymers 43 (2000), 165–172. (no month).
*Hydrothermal Preparation of the Low–Expansion NZP Family of Materials*, Sridhar Komarneni, Int. J. High Technology Ceramics 4 (1988), pp. 31–39. (no month).
*Structure of the Active Sites on $H_3PO/ZrO_2$ Catalysts for Dimethyl Carbonate Synthesis from Menthanol and Carbon Dioxide*, Yoshiki Ikeda et al., J. Phys. Chem R 2001, 105, pp. 10653–10658. (no month).
*Zirconium Phosphates*, Abraham Clearfield, Inorganic Ion Exchange Materials, Chapter 1, pp. 1–74. (no date).
*A Novel Layered Zirconium Phosphate $Zr_2O_3(HPO_4)$. Synthesis and Characterization of Properties*, Anatoly Bortun et al., Solvent Extraction and Ion Exchange, 15(2), pp. 305–328 (1997). (no month).
*Synthesis of Semicrystalline Materials by Organic Compound Intercalation into Amorphous Titanium Phosphate*, Anatoly Bortun and V.V. Strelko, Chem Mater, 1995, 7, pp. 249–251. (no month).
$^{31}$ *P–MASNMR–Spectroscopic Studies with Zirconium Phosphate Catalysts*, Koh–Ichi Segawa et al., Journal of Catalysis 101 pp. 81–89 (1986). (no month).
*P Solid–State NMR Studies of the Structure of Amine–Intercalated a–Zirconium Phosphate. Reaction of a–Zirconium Phosphate with Excess Amine*, D.J. MacLachlan, J. Phys. Chem. 1990, 94, pp. 7656–7661. (no month).
*Preparation and Characterization of a New 3–Dimensional Zirconium Hydrogen Phosphate, $\tau$–$Zr(HPO_4)$ Determination of the Complete Crystal Structure Combining Synchrotron X–ray Single–Crystal Diffraction and Neutron Powder Diffraction*, Anne Marie Krogh Andersen, Inorg. Chem 1998, 37, pp. 876–881. (no month).
*Proton Conductivity and Humidity–Sensing Properties at High Temperature of the NASICON–Based Composite Material $HZr_2P_3O_{12}ZrP_2O_{71}$* Shouhua Feng et al., Chem. Mater, 1993, 5, pp. 1277–1282. (no month).
*Zirconium Deficiency in Nasicon–Type Compounds: Crystal Structure of $Na_3Zr(PO_4)_{31}$*, J.P. Boilot et al., Journal of Solid State Chemistry, 50, pp. 91–99, (1983). (no month).
*Hydrothermal Synthesis and Characterisation of Crystalline Sodium Zirconium Phosphates*, M.K. Dongare et al., Mat. Res. Bull., vol. 27, pp. 637–645 (1992). (no month).
*Hydrothermal Preparation of the Low–expansion NZP Family of Materials*, Sridhar Komameni, Int. J. High Technology Ceramics 4 (1988) pp. 31–39. (no month).
*Zirconium and Hafnium Hydroxo–orthophosphates*, N.G. Chernorukov et al., Russian Journal of Inorganic Chemistry, 28 (7) 1983 pp. unknown. (no month).
*The Sorption of First–Row Transition Metal Ions on a Zirconium Phosphate Gel of Low Crystallinity and Study of the Reproducibility of the Gel*, Sten Ahrland et al., J. Inorg. Nucl. Chem, 1970, vol. 32, pp. 2069–2078. (no month).

*Direct hydrothermal sysntesis of Zirconium phosphate and Zirconium arsenate with a novel basic layered structure in alkaline meida*, Abraham Clearfield, et al., Inorganic Chemistry Communications 1 (1998) pp. 206–208. (no month).

*Solid–state Nuclear Magnetic Resonance Spectroscopic Study of γ–Zirconium Phosphate*, Nigel Clayden, J Chem. Soc. Dalton Trans (1987), pp. 1877–1881. (no month).

*Influence of Precipitating Agent and Digestion on the Morphology and Microstructure Zirconia of Hydrous*, G.K. Chuah et al., Journal of Catalysis 175, pp. 80–92 (1998) Article No. CA981980. (no month).

*Ion Exchange Properties of TIN (IV) Materials–1, Hydrous TIN(IV) Oxide and its Cation Exchange Properties*, J.D. Donaldson et al. J. Inorg. Nucl. Chem., 1968, vol. 30. pp. 1083–1092. (no month).

*Preparation and Sorption Properties of Spherical Polyacrylamide–Zirconium Phosphate Ion–Exchanger.*, Chao–Yeuh Yang et al., Separation Science and Technology, 18(1), pp. 83–91, (1983). (no month).

*On the Synthesis of a–Zirconium Phosphate*, Camino Trobajo, et al., Chem. Mater, 2000, 12, 1787–1790. (no month).

* cited by examiner

ZIRCONIUM PHOSPHATE AND METHOD OF MAKING SAME

BACKGROUND OF THE INVENTION

Ion exchange technologies are widely used for water and waste treatment in hydrometallurgy, biochemistry, medicine, environmental protection and many other industries. It is well known that their efficiency depends on many factors, the main among them being the selectivity of the exchanger in use. Inorganic ion exchangers and adsorbents, due to such properties as chemical and thermal stability, resistance to oxidation and unique selectivity to certain ions, have definite advantages in comparison with well known and traditionally used organic resins. It was found that inorganic ion exchangers are able to operate in extreme conditions (high temperature or strong radiation fields, in the presence of organic solvents and/or oxidants and in a great excess of competitive ions), where organic resins fail to work efficiently. Among the known inorganic adsorbents zirconium phosphates (ZrP) have been studied in detail. Zirconium phosphates can be amorphous or crystalline and have a general formula $ZrO_2 \cdot nP_2O_5 \cdot mH_2O \cdot (xMO)$, where $n=0–2.5$, $m>0$, $x=0–5$, M=metal ion.

Conventional methods of preparing amorphous zirconium phosphates include reaction between aqueous solutions of a zirconium salt and a phosphorus containing reagent, such as phosphoric acid or its salts, with an instantaneous formation of a gel precipitate. Thereafter the precipitate is filtered, washed and/or subjected to any additional treatments and dried. The final product after drying is a fine powder or granules with irregular form. The large amount of experimental work performed in this field is summarized in several review books (Amphlett, C. B. Inorganic Ion Exchangers. Elsevier, New York (1964); Clearfield A., Ed. Inorganic Ion Exchange materials, C.R.C. Press USA, 1982; Vesely, V. and Pekarek, V. Synthetic inorganic ion exchangers, Talanta. 19, 219 (1972) and patents, including U.S. Pat. Nos. 3,056,647; 3,485,763; 4,025,608; 4,381,289, and 2,349,243, all of which are incorporated herein by reference. Depending on the experimental conditions, such as pH, temperature, duration, etc., and composition of the reaction mixture, the P/Zr ratio in the final product can vary in a broad range from ~0 up to 2.0. Amorphous products typically contain $HPO_4$, $H_2PO_4$, $PO_4$ and, in some cases, Zr—OH groups. The presence of phosphorus-containing functional groups such as $HPO_4$ and $H_2PO_4$ provides cation exchanger properties to zirconium phosphates. As discussed in S. Ahrland, et al, J. Inorg. Nucl. Chem., 32, 2069 (1970), some amorphous zirconium phosphates show affinity towards transition metals. However, amorphous zirconium phosphates synthesized via the precipitation route have several drawbacks, including:

- strong dependency between ion exchange performance and moisture content, which suggests loss of capacity and deterioration of kinetics of sorption with the loss of water during storage or under drying;
- low thermal stability;
- poor mechanical and hydrodynamic properties of sorbents (powders, granules of irregular form), preventing use for column type applications.

As discussed in French Pat. No. 1,317,359 (1963); U.S. Pat. No. 4,806,517 and C. Y. Yang, Separ. Sci. & Techn., 18, 91 (1983), amorphous zirconium phosphates in powdered form can be granulated with the use of organic or inorganic binders. This approach allows the production of mechanically strong ion exchangers in the form of beads or extrudates of desired shape suitable for column applications. However, use of binders affects the total ion exchange capacity, the kinetics of adsorption and limits certain applications due to solubility of the binder and possibility of additional contamination of the product.

Granulated amorphous zirconium phosphates without the use of binders can be prepared via sol-gel or gel routes. Sol-gel granulation processes based on the oil-drop principle include conversion of $ZrO_2$ sol into hydrous zirconium oxide gel (spherical granules with a particle size of 0.1–3 mm) in organic water immiscible media followed by conversion into zirconium phosphate by treatment of the $ZrO_2$ gel with a phosphoric acid or phosphoric acid salt (R. Caletka, M. Tympl, J. Radioanal. Chem., 30: 155 (1976). The gel method, also based on the oil-drop principle, includes reaction between aqueous solutions of zirconium salt and phosphoric acid (or its salt) in the presence of Zr-complexing reagent such as $H_2O_2$, polyatomic alcohols and organic oxyacids, which allows a direct formation of zirconium phosphate gel (Amphlett, C. B. Inorganic Ion Exchangers. Elsevier, New York (1964); V. V. Strelko, Chemistry Role in the Environmental Protection, p. 179, Naukova Dumka, Kiev (1982)). Spherically granulated zirconium phosphate sorbents prepared via sol-gel and gel routes have high crush strength and good attrition resistance. However, they still have drawbacks of a strong dependency between ion exchange performance and moisture content, as well as low thermal stability.

Another method of making granulated zirconium phosphate is described in U.S. Pat. No. 4,025,608. According to this method zirconium phosphate is made by the reaction of a zirconium salt, having a predetermined particle size of 30–40 microns, with phosphoric acid or a phosphate in a liquid medium. Amorphous zirconium phosphate made according to this method also has drawbacks of a strong dependency between ion exchange performance and moisture content, as well as low thermal stability.

Crystalline zirconium phosphates can be prepared by treatment of amorphous zirconium phosphates in the presence of excess of $H_3PO_4$ at elevated temperature for long periods of time (A. Clearfield, J. A. Stynes, J. Inorg. Nucl. Chem., v.26, 117, (1964), U.S. Pat. Nos. 3,130,147 and 4,695,642); by slow decomposition of fluoro-zirconium complexes in the presence of $H_3PO_4$ (G. Alberti et al, J. Inorg. Nucl. Chem., v.30, 317, (1968)); by reaction between aqueous solutions of a zirconium salt and a phosphorus containing reagent (phosphoric acid or its salts) under hydrothermal conditions (S. Komarneni, Int. J. High Tech. Ceram., 4, 31, (1988); M. K. Dongare et al, Mat. Res. Bull. v.27, 637–645, (1992)); and also via solid state reactions between $ZrO_2$ or Zr salts and salts of phosphoric acid (J. M. Winand et al, J. Solid State Chem., 107, 356 (1993); V. A. Sadykov et al, Kinetics and Catal., 42, 344, (2001)). Depending on the experimental conditions, composition of the reaction, presence of templates, mixtures of different crystalline modifications of zirconium phosphate, both layered and framework, can be prepared. Among them are hydrated products like $\alpha\text{-}Zr(HPO_4)_2 \, H_2O$ (A. Clearfield, J. A. Stynes, J. Inorg. Nucl. Chem., v.26, 117, 1964), $\gamma$-Zr $(H_2PO_4)(PO_4) \, 2H_2O$ (A. Clearfield et al, J. Inorg. Nucl. Chem., v.30, 2249, 1968), $\tau\text{-}Zr(HPO_4)_2 \, H_2O$ (A. M. K. Andersen et al, Inorg. Chem., v.37, 876–881, 1998), $\psi\text{-}Zr_2O_3(HPO_4) \, nH_2O$ (A. Clearfield et al, Inorg. Chem. Comm., 1, 208 (1998), $HZr_2(PO_4)$ (S. Feng, M. Greenblatt, Chem. Mater., v.4, 1257, 1992), or non hydrated materials like $MZr_2(PO_4)_3$, $MZr_5(PO_4)_7$ (M. K. Dongare et al, Mat. Res. Bull. v.27, 637–645, 1992), $M_5$ (J. P. Boilot et al, J. Solid State Chem., 50, 91 (1983), $ZrP_2O_7$, $Zr(OH)PO_4$ (N. G. Chernorukov et al, J. Inorg. Chem., v.28, 934 (1984), and so on.

Some crystalline zirconium phosphates contain exchangeable ions ($H^+$ or metal cations) and show ion exchange properties. Selectivity of crystalline materials strongly depends on the type of crystal structure and, in some cases, is much higher than that of amorphous compounds. Another advantage of crystalline materials is that they are less susceptible to moisture content than amorphous sorbents and, as result, are more thermally stable. However, disadvantages of crystalline ion exchangers include poor adsorption kinetics and their powdered form, which prevents their use in column applications.

SUMMARY OF THE INVENTION

In accordance with one aspect of the invention there is provided a zirconium phosphate compound having a P:Zr ratio of from about 1.8–2.0 to 1, which compound has an H-form which exhibits a single peak at −13.7±0.5 ppm in the $^{31}$P NMR spectra. In a preferred aspect of the invention the foregoing compound has a structure which exhibits x-ray diffraction peaks and includes a d-spacing of 18.4±0.3 Å when intercalated with n-butylamine. The preferred compounds according to the invention will have a sodium form which exhibits a single peak at −7.8±0.5 ppm in the $^{31}$P NMR spectra.

In accordance with another aspect of the invention, there is provided a compound having the formula $Zr(HPO_4)_2 \cdot nMe_xO \cdot mH_2O$, wherein n=0–1.2, m=0.5–3.0, x=0.5–1 selected from $NH_4$ or a metal selected from Li, Na, K, Cs, Mg, Ca, Sr or Ba. A preferred compound according to the invention has the formula $Zr(HPO_4)_2 \cdot nNa_2O \cdot mH_2O$, wherein n=0–1.2 and m=0.5–3.0. In one aspect of the invention the compound is provided in granular form having a particle size from about 50 microns to about 60 microns.

In a preferred embodiment, the compounds of the invention exhibit an affinity for $Co^{+2}$ ions characterized by Kd≧500 mL/g and for $Ni^{+2}$ ion characterized by Kd≧400 mL/g at LOD 18%, based on a simulant solution of 0.5 M $NaNO_3$+0.001 M $Co(NO_3)_2$+0.001 M $Ni(NO_3)_2$. Still more preferably, the compounds of the invention exhibit an affinity for $Co^{+2}$ ions characterized by Kd≧1000 mL/g and for $Ni^{+2}$ ion characterized by Kd>800 mL/g at LOD 18%, based on a simulant solution of 0.5 M $NaNO_3$+0.001 M $Co(NO_3)_2$ +0.001 M $Ni(NO_3)_2$.

In further aspects of the invention, the foregoing zirconium phosphate compounds provide an ion exchange media, a catalyst or a catalyst support. Preferably, the ion exchange media has an average particle size of from about 50 microns to about 60 microns.

It is still a further aspect of the invention to provide a method of making a zirconium phosphate compound, and the resulting zirconium phosphate compound, comprising mixing a water insoluble zirconium compound with an aqueous solution of an acidic phosphorous and sulfate containing reagent to produce a reaction mixture having a phosphorous to zirconium ratio of from about 2.0–2.5:1, and reacting said mixture at above room temperature to produce said zirconium phosphate compound. Preferably, said zirconium compound is selected from a basic zirconium sulfate, a basic zirconium carbonate or a hydrous zirconium oxide and, more preferably still, has an average particle size from about 50 microns to about 60 microns, so as to produce said zirconium phosphate having an average particle size within said range.

In a preferred aspect of the invention the method comprises forming said acidic phosphorous and sulfate containing reagent from a phosphorous containing component selected from phosphoric acid, a mono-hydrogen phosphate of an alkali metal, a mono-hydrogen phosphate of ammonia or mixtures thereof, and a sulfate containing component selected from sulfuric acid, a sulfate of an alkali metal, a sulfate of ammonia or mixtures thereof. Still more preferably, the phosphorous and sulfate containing reagent has a a pH less than about 4 and, more preferably still, comprises phosphoric acid and sulfuric acid. In one embodiment, said acidic phosphorous and sulfate containing reagent comprises phosphoric acid and sulfuric acid in a molar ratio of 0.25–2.0:1. Preferably, the method comprises reacting said mixture at a temperature of from about 80° C. to boiling point from about 1 to about 3 hours.

In a preferred aspect of the invention there is provided a method of making a zirconium phosphate compound comprising forming an acidic phosphorous and sulfate containing reagent from a phosphorous containing component selected from phosphoric acid, a mono-hydrogen phosphate of an alkali metal, a mono-hydrogen phosphate of ammonia or mixtures thereof, and a sulfate containing component selected from sulfuric acid, a sulfate of an alkali metal, a sulfate of ammonia or mixtures thereof, mixing a water insoluble zirconium compound with an aqueous solution of said acidic phosphorous and sulfate containing reagent to produce a reaction mixture and reacting said mixture at above room temperature to produce said zirconium phosphate compound. Preferably, the method comprises forming said reaction mixture to have a phosphorous to zirconium ratio of from about 2.0–2.5:1 and said acidic phosphorous and sulfate containing reagent at a pH of less than about 4. Still more preferably, said acidic phosphorous and sulfate containing reagent comprises phosphoric acid and sulfuric acid and, more preferably still, the acidic phosphorous and sulfate containing reagent comprises phosphoric acid and sulfuric acid in a molar ratio of 0.25–2.0:1 and the mixture is reacted at a temperature of from about 80° C. to boiling point, preferably for from about 1 to about 3 hours.

In yet another aspect of the invention there is provided a method of removing cations, preferably $Co^{+2}$ and $Ni^{+2}$ ions, from a fluid comprising contacting said fluid with a zirconium phosphate compound as described above.

DESCRIPTION OF THE INVENTION

Figure 1:
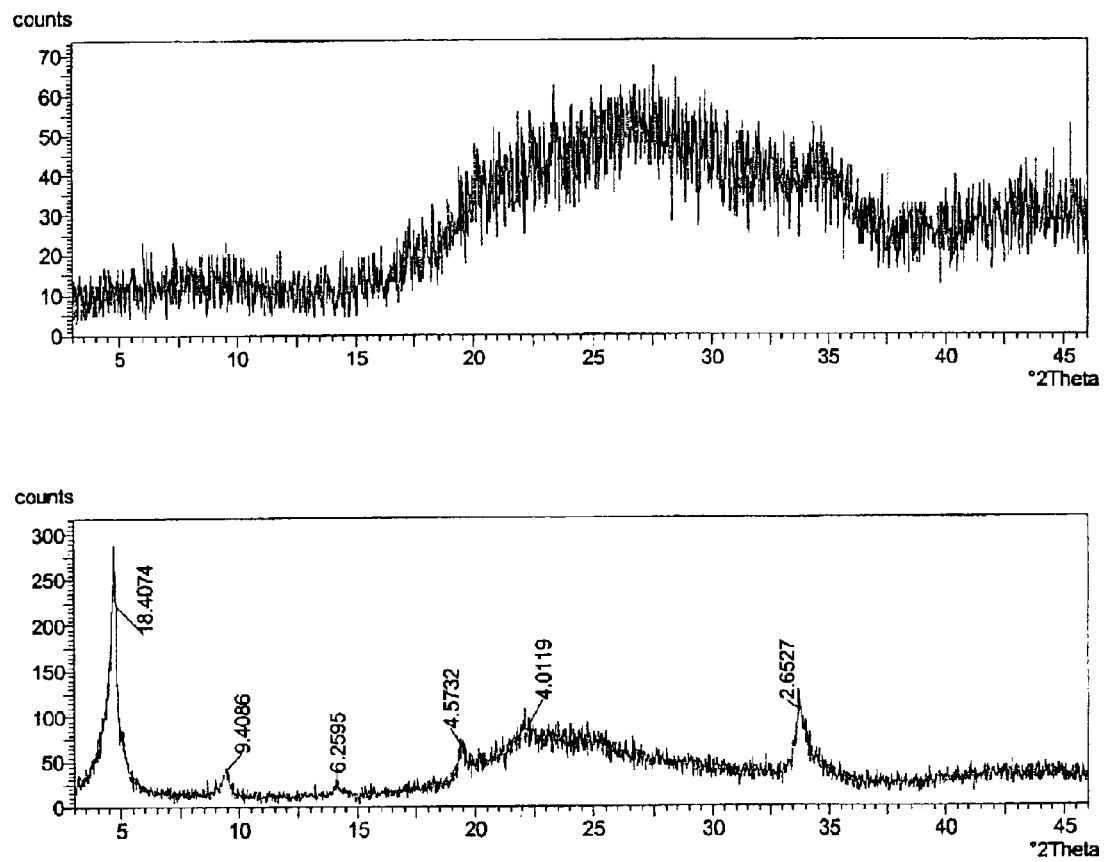
FIG. 1 shows the x-ray diffraction patterns of the zirconium phosphate of the invention before and after intercalation with n-butylamine.

The inventors have discovered a new quasi-layered zirconium phosphate which exhibits good ion exchange properties and advantageously has exceptionally high affinity towards $Co^{2+}$ and $Ni^{2+}$ ions, as well as a high resistance to moisture loss, which makes it promising for different ion exchange applications, as a catalyst and as a catalyst support. Moreover, the new zirconium phosphate can be prepared with a predetermined, narrow particle size distribution, rendering it particularly suitable for column applications. The preferred zirconium phosphate of the invention is a monohydrogen phosphate of the formula $Zr(HPO_4)_2 \cdot nNa_2O \cdot mH_2O$, where n=0–1.2; m=0.5–3, which has a predetermined particle size on the order of 50 to 60 microns. While not wanting to be bound by theory, the preferred zirconium phosphate is believed to have a quasi-layered type structure. As used herein, quasi-layered refers to the characteristic of the inventive zirconium phosphate wherein, when in its H-form, Na-form, K-form and the like, the compound appears amorphous because there are no peaks (reflections) in its X-ray diffraction (XRD) spectrum. However, intercalation with large or long organic amines imparts a quasi-layered structure which is indicated by the appearance of peaks in its XRD spectrum. For purposes herein it is sufficient for the appearance of "peaks" to indicate the existence of this quasi-layered structure in the XRD if the new reflections (peaks) appear in the range below 2 theta=7 degrees with an intensity of at least 300 counts.

This inventive material has a P/Zr molar ratio in the solid of from about 1.80–2.0:1. The new compound in the H-form is characterized by the presence of a single peak at −13.7±0.5 ppm in the $^{31}P$ NMR spectra. Without being bound by theory, the downshift of the peak position from −13.7 ppm to −7.8 ppm when the inventive zirconium phosphate is converted from the H-form into the sodium form indicates that the phosphorus atom belongs to an ion exchangeable $HPO_4$ group. As seen in Table 1, a comparison of $^3P$ NMR spectrum of the inventive zirconium phosphate with the spectra of known crystalline and amorphous compounds suggests that this is a new zirconium phosphate.

TABLE 1

Peak positions in solid state $^{31}P$ NMR spectra of zirconium phosphates

| Compound | Signal, ppm | Reference |
|---|---|---|
| α-Zr(HPO$_4$)$_2$.H$_2$O | −18.7 | N. J. Clayden, Chem. Soc. Dalton. Trans., 1877 (1987) |
| α-Zr(NaPO$_4$)$_2$.H$_2$O | −14.6 & −15.9 | D. J. MacLachlan, K. R. Morgan, J. Phys Chem., v. 94, 7656 (1990) |
| γ-Zr(H$_2$PO$_4$)(PO$_4$).2H$_2$O | −9.4 & −27.4 | N. J. Clayden, Chem. Soc. Dalton. Trans., 1877 (1987) |
| τ-Zr(HPO$_4$)$_2$.H$_2$O | −23.7 | A. M. K. Andersen et al, Inorg. Chem., v. 37, 876–881 (1998) |
| ψ-Zr$_2$O$_3$(HPO$_4$).nH$_2$O | −11.8 | A. I. Bortun et al, Solv. Extr. Ion. Exch., v. 15, 305 (1997) |
| ψ-Zr$_2$O$_3$(NaPO$_4$).nH$_2$O | −8.8 | A. I. Bortun et al, Solv. Extr. Ion. Exch., v. 15, 305 (1997) |
| NaZr$_2$(PO$_4$)$_3$ | −24.7 | M. K. Dongare et al, Mat. Res. Bull. v. 27, 637–645 (1992) |
| NaZr$_5$(PO$_4$)$_7$ | −8.4, −20.1 & −24.5 | M. K. Dongare et al, Mat. Res. Bull. v. 27, 637–645 (1992) |
| Na$_5$Zr(PO$_4$)$_3$ | −2.0 & −6.6 | K. C. Sobha, K. J. Rao, J. Solid State Chem., v. 121, 197 (1996) |
| Zirconium phosphate Gel | −11.8, −19.3 & −25.3 | K. Segawa, Y. Nakajima, J. Catal., v. 101, 81, (1986) |
| Zirconium phosphate Gel | −14.3, −20.8 & −26.8 | Y. Ikeda et al., J. Phys. Chem., B, v. 105, 10653 (2001) |
| Inventive ZrP, H-form | −13.7 | Present invention |
| Inventive ZrP, Na-form | −7.8 | Present invention |

As noted above, the novel amorphous zirconium phosphate of the invention is believed to have a quasi-layered type structure which is at least partially responsible for its unique ion exchange properties. Surprisingly, the inventive zirconium phosphate exhibits the quasi-layered structure despite the fact that all of the insoluble zirconium salts used in its manufacture have a framework type structure. The foregoing conclusion as to the structure of the inventive compound is based on the fact that it reacts easily with amines giving layered intercalates which exhibit crystallinity, as seen by the presence of peaks in the x-ray diffraction pattern of the intercalated compound. As seen in FIG. 1, there is a drastic change in the x-ray diffraction pattern of the zirconium phosphate after its intercalation with n-butylamine. The data in FIG. 1 were obtained by powder X-ray diffraction measurements carried out in a Phillips diffractometer, model PW 1729/1720 (scan speed 1 deg/min., Cu Kα radiation, λ=1.5418E). The N-butylamine intercalate was prepared by contacting the ZrP in its H-form with n-butylamine vapors, saturated in a closed volume for 4 days. The same n-butylamine intercalate can be prepared starting from the Na-form. However, in this case it should be contacted with a 0.1 M aqueous solution of n-butylamine HCl salt. In the unintercalated state, no XRD pattern is seen, consistent with an amorphous compound. However, when intercalated, the compound exhibits x-ray diffraction peaks consistent with crystallinity.

Again, while not wanting to be bound by theory, the current state of knowledge in the field of zirconium phosphate synthesis indicates that amorphous, gel precipitates should have a quasi-layered structure of α-ZrP type. See, e.g., S. G. Bogdanov et al, J. Phys. Condensed Matter, 9, 4039 (1997); C. Trabajo et al, Chem. Mater., 12, 1790 (2000), incorporated herein by reference. The d-spacing of the n-butylamine intercalate for the novel zirconium phosphate of the invention is 18.4±0.3 Å, intercalates by D. J. MacLachlan, K. R. Morgan, J. Phys. Chem., v.94, 7656, (1990). All together, the difference in d-spacings and unique $^{31}P$ NMR spectrum suggest that the compound of the invention is a new phase of metastable hydrated zirconium phosphate. As noted above, it is believed that the unique structure of this metastable zirconium phosphate is responsible for the unique ion exchange properties of the sorbent, namely unexpectedly high affinity for $Co^{2+}$, $Ni^{2+}$ ions.

Figure 2:
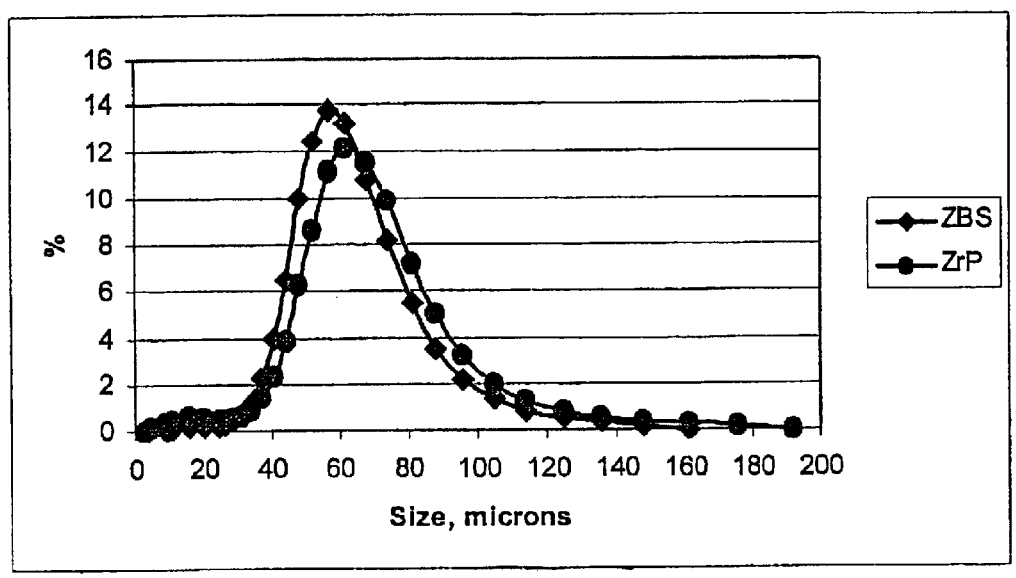
FIG. 2 shows the particle size distribution of a basic zirconium sulfate starting material and the resulting zirconium phosphate of the invention.

The amorphous zirconium phosphate of the invention is prepared by a novel process which is advantageously practical from an industrial standpoint. In the preferred process a suspension of water insoluble zirconium salt, having a predetermined particle size distribution, is reacted with an aqueous solution of acidic phosphorus-containing reagent at elevated temperature and normal pressure. Advantageously, the process of the invention produces a product having a particle size similar to that of the starting material. Thus, by selecting the starting material to have a predetermined particle size one can obtain a granulated amorphous product with substantially the same particle size. For example, as seen in FIG. 2, by selecting a zirconium salt with an average granule size of 50–60 microns as the starting material, the inventive process produces a zirconium phosphate based adsorbent with a similar particle size distribution. Although not necessary to the invention, the noted particle size distribution is advantageous because it produces low back pressure and quick exchange kinetics, making it ideally suited for specific separation applications such as the removal of toxic heavy metals from drinking water under column conditions.

The process conditions in the current invention, e.g., temperature, type of reagents, reagent concentrations, molar ratios and duration etc., are chosen to create a unique environment for transformation of the water insoluble zirconium salt starting material into the zirconium phosphate of the invention, having a quasi-layered structure, without destroying particle size integrity.

As noted above, in the preferred embodiment the process of the invention begins by reacting a suspension of water insoluble zirconium compound, preferably a zirconium salt, with an aqueous solution of an acidic phosphorous and sulfate containing reagent. Suitable zirconium salts include basic zirconium sulfates, basic zirconium carbonates and hydrous zirconium oxides, which are typically amorphous compounds having a framework structure. A preferred zirconium sulphate is $Zr(OH)_2SO_4$. If the product is to be used for column applications, then it is desirable to select a zirconium salt having a particles size between about 50 and 60 microns.

The desired starting zirconium salt is added to an aqueous solution of acidic phosphorous and sulfate containing reagent and reacted therewith at a temperature of from about 80° C. to boiling point for from about 1 to about 3 hours to produce the H-form of the inventive amorphous zirconium phosphate. The acidic phosphorous containing reagent is chosen so that the P/Zr ratio in the reaction system is between about 2.0–2.5:1, and the phosphorous ion concentration is in the range from about 1.5 M to 3.0 M. The phosphorous component of this reagent may be selected from monohydrogen phosphates of alkali metals and ammonium, and is preferably $H_3PO_4$. The acidic phosphorous and sulfate containing reagent additionally contains a sulfate containing component selected from sulfuric acid, a sulfate of an alkali metal, a sulfate of ammonia or mixtures thereof Preferably, the sulfate containing component is an acid selected from $H_2SO_4$ or a mixture of sulfuric acid and HCl and/or $HNO_3$ and is preferably sulfuric acid. While not wanting to be bound by theory, it is believed that the resulting compound is due to the presence of sulfate ions in an acidic pH of less than about 3.5. The preferred phosphoric and sulfuric acid are present in the molar ratio of 0.25–2.0:1. Once reacted to obtain the H-form of the inventive zirconium phosphate, the product is filtered and washed. Other suitable reagents and reaction conditions will be apparent to those of ordinary skill in the art in view of the instant disclosure.

If desired, the novel zirconium phosphate may be re-slurried and converted to a sodium or other desirable form, such as a potassium form. The zirconium phosphate may be converted into the sodium form by a neutralization with a basic reagent to pH=6–8 and thereafter dried at 100–200° C. for 1–18 hours. Thereafter, the sorbent is ready for direct applications or storage. Suitable basic reagents for conversion to the sodium form include NaOH, $NaHCO_3$, and $Na_2CO_3$. Similarly, KOH may be used to convert the compound to the potassium form. Conversion to these and other forms, and suitable reagents therefore, will be apparent to those of ordinary skill in the art in view of the present disclosure and the following non-limiting examples. It will also be apparent to those of ordinary skill in the art from the present disclosure, that selection of any particular form over another will depend on the desired application. For example, use in sodium containing solutions will generally dictate the use of the sodium form in order to avoid unnecessary contamination of the solution with other ions. Similarly, for removal of admixtures from potassium containing solutions, the potassium form may be preferable. Likewise, the H-form can be used in environments where acidification is not an issue. It will be well within the level of skill in the art to select the preferred form for any given application environment in view of the present disclosure.

The following experimental procedures were used in the Examples below. Powder X-ray diffraction measurements were carried out in a Phillips diffractometer, model PW 1729/1720 (scan speed 1 deg/min., Cu Kα radiation, λ=1.5418E). Particle size distribution (PSD) was measured using a Leeds-Northrup, Microtrack X100. BET surface measurements and pore size determinations were done using nitrogen adsorption on a Coulter SA3100. Samples were degassed at 280° C. in a vacuum. Water loss was determined at 209° C. on a Denver Instrument hot plate, and phosphorus, alkali, alkaline-earth and transition metals in solutions were determined via the ICP method using a Varian, Vista-MPX instrument.

EXAMPLE 1

A zirconium phosphate according to the invention was prepared by the following multi-step procedure. First, a slurry containing 750 g of basic zirconium sulfate (40% $ZrO_2$)(MEI, ZBS PP142A), with a particle size of 50–60 microns, in 3.0 L of the acidic phosphorus-containing solution is made. The acidic phosphorus containing solution had the following composition: 681 g of 75% $H_3PO_4$, 300 g of 62% $H_2SO_4$ and water to maintain total volume of 3.0 L. The P/Zr ratio in the slurry was 2.13:1; the $H_2SO_4/H_3PO_4$ ratio was 0.36:1 and the molar concentration of $H_3PO_4$ was 1.73 M. The slurry was heated to a boil and maintained at temperature for 2 hours under constant stirring. After the reaction was complete the product was filtered and washed with 2.0 kg of water to produce zirconium phosphate in the H-form. To produce the sodium form, the zirconium phosphate was re-slurried in 2 L of water and 30% NaOH solution was added gradually for 30–40 min. to adjust the pH of the zirconium phosphate suspension to pH 7.0. The zirconium phosphate was then filtered, washed with 1 kg of water and dried at 150° C. for 12 hours in air.

Figure 3:
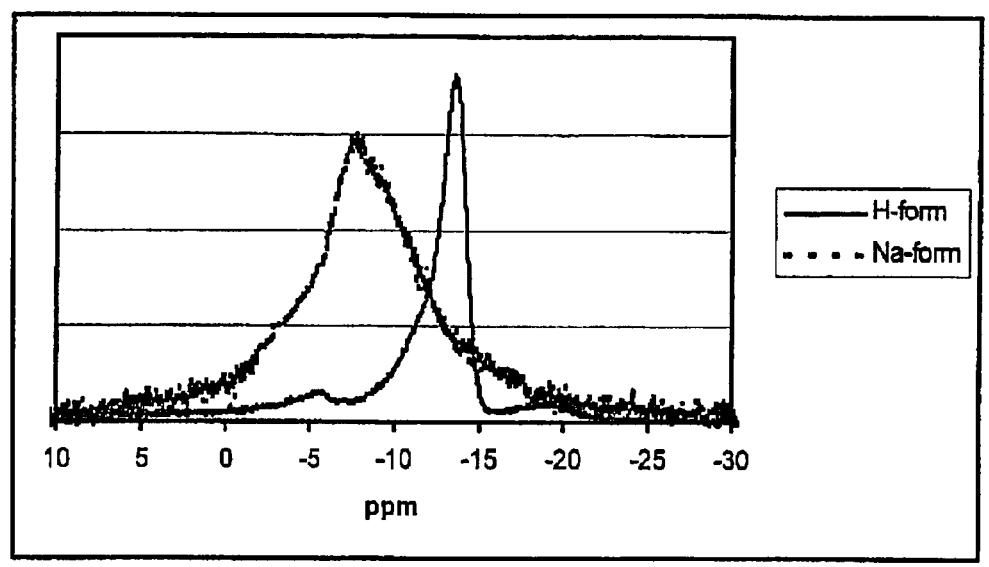
FIG. 3 shows the $^{31}$P NMR spectra of the zirconium phosphate of the invention in its H and Na forms.

The dried product is zirconium monohydrogen phosphate with a particle size similar to that of the initial basic zirconium sulfate (FIG. 2). According to elemental analysis the P/Zr ratio in the solid is 1.95:1. The $^{31}P$ NMR peak position is at −13.7 ppm for the H-form and −7.8 ppm for the Na-form (FIG. 3). The surface area is 11 $m^2/g$ and water loss at 209° C. (LOD) is <1%.

EXAMPLE 2

In this example, 526 g of hydrous zirconium oxide (57% $ZrO_2$) having a particle size of 50–60 microns was used as the source of zirconium. All other operations and amounts of reagents were similar to those used in Example 1. The dried product is zirconium monohydrogen phosphate with particle size of 50–60 microns. According to elemental analysis the P/Zr ratio in the solid is 2.00:1. The $^{31}P$ NMR peak position is at −13.7 ppm for the H-form. The surface area is 9.5 $m^2/g$ and water loss at 209° C. (LOD) is <1%.

EXAMPLE 3

In this example, 750 g of zirconium basic carbonate with a particle size of 50–60 microns was used as the source of zirconium. All other operations and amounts of reagents were similar to those used in Example 1. The dried product is zirconium monohydrogen phosphate with particle size of 50–60 microns. According to elemental analysis the P/Zr ratio in the solid is 1.85:1. The 31P NMR peak position is at −13.6 ppm for the H-form. The surface area is 12.2 $m^2/g$ and water loss at 209° C. (LOD) is <1%.

EXAMPLE 4

In this example, the $H_2SO_4/H_3PO_4$ molar ratio was 0.5 and the $H_3PO_4$ concentration was 3.0 M. All other operations and amounts of reagents are similar to those used in Example 1. The dried product is zirconium monohydrogen phosphate with particle size of 50–60 microns. According to elemental analysis the P/Zr ratio in the solid is 2.00:1. The $^{31}P$ NMR peak position is at −13.7 ppm for the H-form. The surface area is 8.0 $m^2/g$ and water loss at 209° C. (LOD) is <1%.

EXAMPLE 5

In this example, the $H_2SO_4/H_3PO_4$ molar ratio was 2.0 and the $H_3PO_4$ concentration 1.5 M. All other operations and amounts of reagents are similar to that used in Example 1. The dried product is zirconium monohydrogen phosphate with a particle size of 50–60 microns. According to elemental analysis the P/Zr ratio in the solid is 2.00:1. The $^{31}P$ NMR peak position is at −13.7 ppm for the H-form. The surface area is 11.0 $m^2/g$ and water loss at 209° C (LOD) is <1%.

EXAMPLE 6

The ion exchange properties of the zirconium monohydrogen phosphate prepared in Example 1 in the sodium form were tested under static conditions. 0.2 g of sorbent was contacted with 20.0 mL of simulant solution of composition: 0.5 M $NaNO_3$+0.001 M $Co(NO_3)_2$+0.001 M $Ni(NO_3)_2$, for 24 hours under constant shaking at 60 Hz, approx. 1" amplitude. Ni and Co concentration in solution before and after contact with the inventive zirconium phosphate were determined using the ICP method. The affinity of the adsorbents towards the metals of interest was expressed through the distribution coefficient values. The $K_d$ values were found according to the formula $K_d=(C_o-C_i/C_i)\cdot V/m$, where $C_o$ is the initial concentration in solution, $C_i$ is the concentration after equalibrium with the adsorbent, V is the volume in mL, and m is the mass of the exchanger in grams. The data on distribution coefficient values ($K_d$, mL/g) are presented in Table 2. For comparison, analogous $K_d$ values for α-ZrP and amorphous prior art sorbent are also shown. Zirconium phosphate "prior art" was made according to Example 2 of U.S. Pat. No. 4,025,608 and dried to LOD 18%.

Table 2. The $K_d$ values for the inventive zirconium phosphate, zirconium phosphate "prior art" and α-ZrP

TABLE 2

| Ion | Example 1 (LOD 18%) | Prior Art (LOD 18%) | α-ZrP |
| --- | --- | --- | --- |
| $Co^{2+}$ | 8,800 | 187 | <5 |
| $Ni^{2+}$ | 4,710 | 127 | <5 |

The foregoing data show that the inventive zirconium monohydrogen phosphate has 35–45 times higher affinity towards $Co^{2+}$ and $Ni^{2+}$, than prior art material. Crystalline α-ZrP does not adsorb these ions in the presence of sodium ion excess.

In Table 3 the $K_d$ values for $Co^{2+}$ and $Ni^{2+}$ uptake from the same simulant on the inventive zirconium phosphate and ZrP prior art as a function of residual moisture content in the solid are presented. The data show that zirconium phosphate of the current invention has a much higher resistance to moisture loss than prior art ZrP. It is able to efficiently adsorb $Co^{2+}$ and $Ni^{2+}$ ions even after drying to residual moisture content 0% (Kd=3,700 mL/g), whereas prior art zirconium phosphate loses ability to uptake these ions after drying to LOD 10%.

Table 3. The $K_d$ values for $Co^{2+}$ uptake by the zirconium phosphate of the invention and zirconium phosphate "prior art" as function of residual moisture content

TABLE 3

| LOD, % | Example 1 | Prior Art |
| --- | --- | --- |
| 18 | 8,800 | 187 |
| 10 | 7,230 | <10 |
| 4 | 5,200 | No uptake |
| 0 | 3,700 | No uptake |

EXAMPLE 7

In this example, the ion exchange properties of the zirconium phosphate of the invention were tested under column conditions. 5.00 g of zirconium phosphate of the invention in the sodium form was put in a vertical column with an inner diameter 8 mm. An aqueous simulant solution of the following composition: 60 ppm Na, 60 ppm Ca, 22 ppm Mg, 2.0 ppm Co, 2.0 ppm Ni, was passed through the adsorbent bed at a flow rate 120–130 mL/h (or ~25 bed volumes/h) with the use of a peristaltic pump. Concentration of ion of interest in solution before and after passing the adsorbent layer was determined. Based on the data obtained the breakthrough curves were plotted in coordinates: residual concentration of ion in solution (in %) versus amounts of bed volumes (BV) of solution passed through adsorbent.

Figure 4:
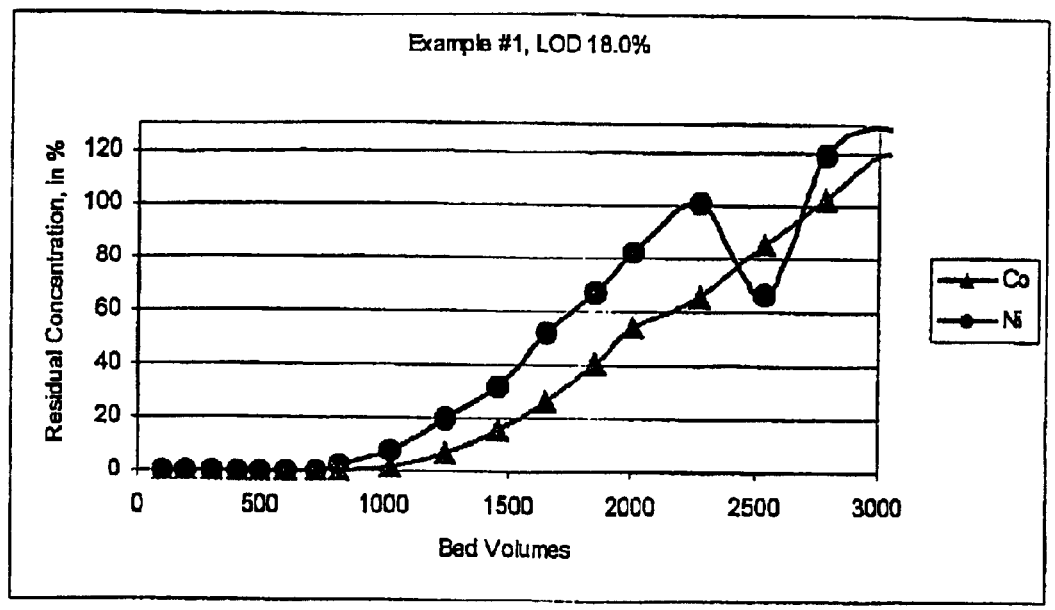
FIG. 4 shows the comparative breakthrough curves for the zirconium phosphate of the invention and a prior art zirconium phosphate.
Figure 4:
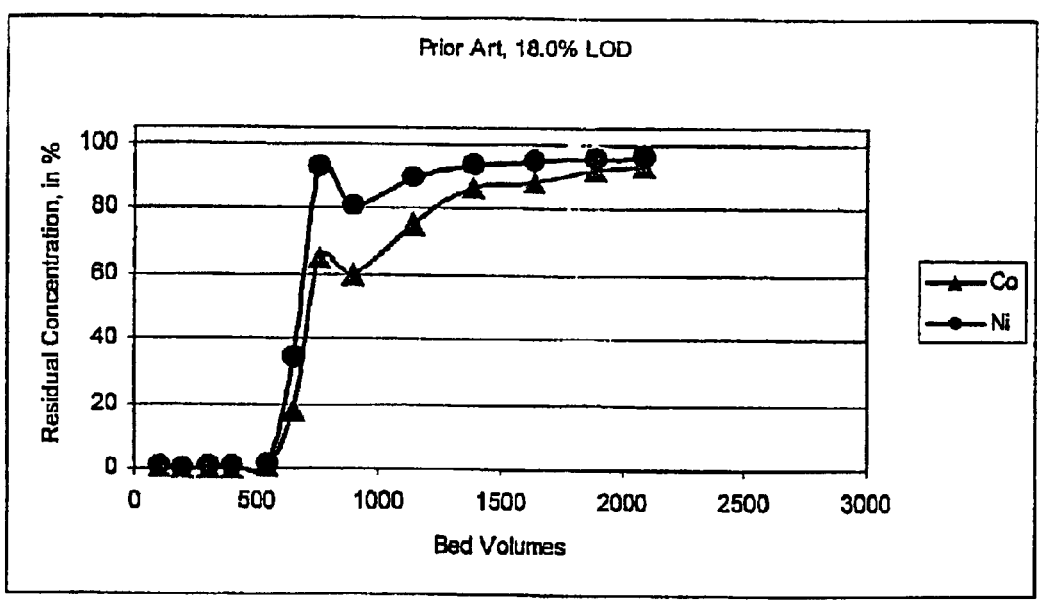

In FIG. 4 the $Co^{2+}$ and $Ni^{2+}$ breakthrough curves for the inventive zirconium phosphate and zirconium phosphate prior art are shown. Zirconium phosphate "prior art" was made according to Example 2 of U.S. Pat. No. 4,025,608 and dried to LOD 18%. The data clearly show that the inventive zirconium phosphate significantly outperforms the prior art sorbent. The inventive material is able to purify 800 BV from $Ni^{2+}$ and 1,000 BV from $Co^{2+}$ in comparison with 400–500 BV for prior art sorbent.

Modifications and variations of the invention will be apparent to those skilled in the art in the light of the foregoing detailed disclosure and drawings. Therefore, it is to be understood that, within the scope of the appended claims, the invention can be practiced otherwise than as specifically shown and described.

What is claimed is:

1. An amorphous zirconium phosphate compound having a P:Zr ratio of from about 1.8–2.0 to 1, which compound has an H-form which exhibits a single peak at −13.7±0.5 ppm in the $^{31}P$ NMR spectra.

2. A compound according to claim 1 which has a structure which exhibits x-ray diffraction peaks when intercalated with n-butylamine.

3. A compound according to claim 1 which has a sodium form which exhibits a single peak at −7.8±0.5 ppm in the $^{31}P$ NMR spectra.

4. A compound according to claim 1 wherein, when intercalated with n-butylamine, said intercalated product includes a d-spacing of 18.4±0.3 Å.

5. A compound according to claim 1 having the formula $Zr(HPO_4)_2 \cdot nMe_xO \cdot mH_2O$, wherein n=0–1.2, m=0.5–3.0, x=0.5–1 and Me is selected from the group consisting of $NH_4$, Li, Na, K, Cs, Mg, Ca, Sr and Ba.

6. A compound according to claim 1 having the formula $Zr(HPO_4)_2 \cdot nNa_2O \cdot mH_2O$, wherein n=0–1.2 and m=0.5–3.0.

7. A compound according to claim 1 in granular form having an average particle size from about 50 microns to about 60 microns.

8. A compound according to claim 1 having the formula $Zr(HPO_4)_2 \cdot nMe_xO \cdot mH_2O$, wherein n=0–1.2, m=0.5–3.0, x=0.5–1 and Me is selected from the group consisting of $NH_4$, Li, Na, K, Cs, Mg, Ca, Sr and Ba, in granular form having an average particle size of from about 50 microns to about 60 microns.

9. An ion exchange compound according to claim 1. compound according to claim 1.

10. A catalyst or catalyst support comprising a zirconium phosphate compound according to claim 1.

11. An ion exchange media comprising a zirconium phosphate compound according to claim 1 having an average particle size of from about 50 microns to about 60 microns.

12. A method of removing cations from a fluid comprising contacting said fluid with a zirconium phosphate compound according to claim 1.

13. A method of making an amorphous zirconium phosphate compound comprising mixing a water insoluble zirconium compounds, an aqueous solution of an acidic phosphorous containing reagent and an aqueous solution of an acidic sulfate containing reagent in a molar ratio of said acidic phosphorous containing reagent and said acidic sulfate containing reagent of 0.25–2.0:1 to produce a reaction mixture having a phosphorous to zirconium ratio of from about 2.0–2.5:1, and reacting said mixture at a temperature and time effective to produce said amorphous zirconium phosphate compound.

14. A method according to claim 13 comprising selecting said zirconium compound from a basic zirconium sulfate, a basic zirconium carbonate or a hydrous zirconium oxide.

15. A method according to claim 13 comprising selecting said zirconium compound to have an average particle size from about 50 microns to about 60 microns to produce said zirconium phosphate having an average particle size within said range.

16. A method according to claim 13 comprising forming said acidic phosphorous containing reagent from a phosphorous containing component selected from the group consisting of phosphoric acid, a mono-hydrogen phosphate of an alkali metal, a mono-hydrogen phosphate of ammonia mixtures thereof, and forming said acidic sulfate containing reagent from a sulfate containing component selected from sulfuric acid, a sulfate of an alkali metal, a sulfate of ammonia or mixtures thereof.

17. A method according to claim 13 comprising forming said acidic phosphorous containing reagent from a phosphorous containing component selected from the group consisting of phosphoric acid, a mono-hydrogen phosphate of an alkali metal, a mono-hydrogen phosphate of ammonia and mixtures thereof, and forming said acidic sulfate containing reagent from a sulfate containing component selected from sulfuric acid, a sulfate of an alkali metal, a sulfate of ammonia or mixtures thereof, and a pH less than about 4.

18. A method according to claim 13 wherein said acidic phosphorous containing reagent and said acidic sulfate containing reagent comprise phosphoric acid and sulfuric acid, respectively.

19. A method according to claim 13 wherein said temperature is from about 80° C. to boiling point.

20. A method according to claim 19 comprising reacting said mixture at said temperature for said time of from about 1 to about 3 hours.

21. An amorphous zirconium phosphate compound prepared by the method of claim 13.

22. A method of making an amorphous zirconium phosphate compound comprising forming an acidic phosphorous and sulfate containing reagent from a phosphorous containing component selected from the group consisting of phosphoric acid, a mono-hydrogen phosphate of an alkali metal, a mono-hydrogen phosphate of ammonia and mixtures thereof, and a sulfate containing component selected from the group consisting of sulfuric acid, a sulfate of an alkali metal, a sulfate of ammonia and mixtures thereof, mixing a water insoluble zirconium compound with an aqueous solution of said acidic phosphorous and sulfate containing reagent comprising phosuhoric acid and sulfuric acid in a molar ratio of 0.25–2.0:1 to produce a reaction mixture having a phosphorous to zirconium ratio of from about 2.0–2.5:1 and reacting said mixture at a temperature and time effective to produce said amorphous zirconium phosphate compound.

23. A method according to claim 22 comprising forming said acidic phosphorous and sulfate containing reagent at a pH of less than about 4.

24. A method according to claim 22 wherein said acidic phosphorous and sulfate containing reagent comprises phosphoric acid and sulfuric acid.

25. A method according to claim 22 wherein said temperature is from about 80° C. to boiling point.

26. A method according to claim 25 comprising reacting said mixture at said temperature for said time of from about 1 to about 3 hours.

27. An amorphous zirconium phosphate compound prepared by the method of claim 22.

28. An amorphous zirconium phosphate compound having an H-form that exhibits a peak at $-13.7\pm0.5$ ppm in the $^{31}P$ NMR spectra.

29. A compound according to claim 28 which exhibits an affinity for $Co^{+2}$ ions characterized by $Kd \geq 500$ mL/g at LOD 18%, based on a simulant solution of 0.5 M $NaNO_3$ + 0.001 M $Co(NO_3)_2$ + 0.001 M $Ni(NO3)_2$.

30. A compound according to claim 29 wherein said affinity for $Co^{+2}$ ions is characterized by $Kd<1000$ mL/g at said LOD and based on said simulant solution.

31. A compound according to claim 28 which exhibits an affinity for $Ni^{+2}$ ions characterized by $Kd \geq 400$ mL/g at LOD 18%, based on a simulant solution of 0.5 M $NaNO_3$ + 0.001 M $Co(NO_3)_2$.0.001 M $Ni(NO_3)_2$.

32. A compound according to claim 31 wherein said affinity for $Ni^{+2}$ ions is characterized by $Kd \geq 800$ mL/g at said LOD and based on said simulant solution.

33. A method of removing $Co^{+2}$ ions from a fluid comprising contacting said fluid with a zirconium phosphate compound according to claim 28.

34. A method of removing $Ni^{+2}$ ions from a fluid comprising contacting said fluid with a zirconium phosphate compound according to claim 28.

35. An amorphous zirconium phosphate compound having the formula $Zr(HPO_4)_2 \cdot nMe_xO \cdot mH_2O$, wherein n=0–1.2, m=0.5–3.0, x 0.5–1 and Me is selected from the group consisting of $NH_4$, Li, Na, K, Cs, Mg, Ca, Sr and Ba which exhibits an affinity for $Co^{+2}$ ions characterized by $Kd \geq 500$ mL/g at LOD 18%, based on a simulant solution of 0.5 M $NaNO_3$ + 0.00 1 M $Co(NO_3)_2$ + 0.001 M $Ni(NO_3)_2$.

36. A compound according to claim 35 wherein said affinity far $Co^{+2}$ ions is characterized by $Kd \geq 1000$ mL/g at said LOD and based on said simulant solution.

37. An amorphous zirconium phosphate compound having the formula $Zr(HPO_4)_2 \cdot nMe_xO \cdot mH_2O$, wherein n=0–1.2, m=0.5–3.0, x=0.5–1 and Me is selected from the group consisting of $NH_4$, Li, Na, K, Cs, Mg, Ca, Sr and Ba which exhibits an affinity for $Ni^{+2}$ ions characterized by $Kd \geq 400$ mL/g at LOD 18%, based on a simulant solution of 0.5 M $NaNO_3$ + 0.00 1 M $Co(NO_3)_2$ + 0.001 M $Ni(NO_3)_2$.

38. A compound according to claim 37 wherein said affinity for $Ni^{+2}$ ions is characterized by $Kd \geq 800$ mL/g at said LOD and based on said simulant solution.

* * * * *

UNITED STATES PATENT AND TRADEMARK OFFICE
CERTIFICATE OF CORRECTION

PATENT NO. : 6,960,328 B2  Page 1 of 3
APPLICATION NO. : 10/195630
DATED : November 1, 2005
INVENTOR(S) : Anatoly I. Bortun and Clive J. Butler It is certified that error appears in the above-identified patent and that said Letters Patent is hereby corrected as shown below:

ON THE COVER PAGE:

Item (56), Foreign Patent Documents, please delete "FR    1317359    3/1963", and insert therefor --FR    1317359    1/1963--.

Item (56), Other Publications, page 2, column 1, line 9, please delete the second occurrence of ".".

Item (56), Other Publications, page 2, column 1, line 24, please delete "Scienca", and insert therefor --Science--.

Item (56), Other Publications, page 2, column 1, line 25, please delete "1998,", and insert therefor --1998.--.

Item (56), Other Publications, page 2, column 2, line 5, please delete "$(M^1)(N^V)_2(PO_4)_3$", and insert therefor --$(M^1)(N^{IV})_2(PO_4)_3$--.

Item (56), Other Publications, page 2, column 2, line 18, please delete "R", and insert therefor --B--.

Item (56), Other Publications, page 2, column 2, line 38, please delete "$\tau\text{-}Zr(HPO_4)$", and insert therefor --$\tau\text{-}Zr(HPO_4)_2$--.

Item (56), Other Publications, page 2, column 2, line 45, please delete "$HZr_2P_3O_{12}ZrP_2O_{71}$", and insert therefor --$HZr_2P_3O_{12}ZrP_2O_7$,--.

Item (56), Other Publications, page 2, column 2, line 48, please delete "$Na_3Zr(PO_4)_{31}$", and insert therefor --$Na_3Zr(PO_4)_3$--.

Item (56), Other Publications, page 2, column 2, line 54, please delete "Komameni", and insert therefor --Komarneni--.

Signed and Sealed this

Eighth Day of June, 2010

David J. Kappos
*Director of the United States Patent and Trademark Office*

CERTIFICATE OF CORRECTION (continued)
U.S. Pat. No. 6,960,328 B2

Item (56), Other Publications, page 3, column 1, line 9, please delete "Zirconia of Hydrous", and insert therefor --of Hydrous Zirconia--.

Column 1, line 1, before "ZIRCONIUM", please insert --NOVEL--.

Column 1, line 23, please delete "$ZrO_2.nP_2O_5.mH_2O).(xMO)$", and insert therefor --$ZrO_2 \cdot nP_2O_5 \cdot mH_2O) \cdot (xMO)$--.

Column 2, line 59, please delete "$HZr_2(PO_4)$", and insert therefor --$HZr_2(PO_4)_3H_2O$--.

Column 2, line 62, after "M5", please insert --$Zr(PO_4)_3$--.

Column 3, line 24, please delete "$nMe_xO.mH_2O$, wherein n=0-1.2, m=0.5-3.0, x=0.5-1", and insert therefor --$nMe_xO \cdot mH_2O$, wherein n=0-1.2, m=0.5-3.0, x=0.5-1 and Me is--.

Column 3, line 27, please delete "$Zr(HPO_4)_2.nNa_2O.mH_2O$", and insert therefor --$Zr(HPO_4)_2 \cdot nNa_2O \cdot mH_2O$,--.

Column 3, line 38, please delete ">", and insert therefor --$\geq$--.

Column 4, line 2, please delete the second occurrence of "a".

Column 4, line 61, please delete "$Zr(HPO_4)_2.nNa_2O.mH_2O$", and insert therefor --$Zr(HPO_4)_2 \cdot nNa_2O \cdot mH_2O$--.

Column 5, line 20, please delete "$^3P$", and insert therefor --$^{31}P$--.

Column 5, Table 1, in the column labeled "Compound", Rows 1-6 are to be corrected as follows:
please delete "$\alpha$-$Zr(HPO_4)_2.H_2O$", and insert therefor --$\alpha$-$Zr(HPO_4)_2 \cdot H_2O$--;
please delete "$\alpha$-$Zr(NaPO_4)_2.H_2O$", and insert therefor --$\alpha$-$Zr(NaPO_4)_2 \cdot H_2O$--;
please delete "$\gamma$-$Zr(H_2PO_4)(PO_4).2H_2O$", and insert therefor --$\gamma$-$Zr(H_2PO_4)(PO_4) \cdot 2H_2O$--;
please delete "$\tau$-$Zr(HPO_4)_2.H_2O$", and insert therefor --$\tau$-$Zr(HPO_4)_2 \cdot H_2O$--;
please delete "$\psi$-$Zr_2O_3(HPO_4).nH_2O$", and insert therefor --$\psi$-$Zr_2O_3(HPO_4) \cdot nH_2O$--;
please delete "$\psi$-$Zr_2O_3(NaPO_4).nH_2O$". and insert therefor --$\psi$-$Zr_2O_3(NaPO_4) \cdot nH_2O$--.

Column 6, line 19, after "Å", please insert --which is close, but somewhat less than the d-spacings of 18.6-19.0 Å reported for $\alpha$-ZrP--.

Column 6, line 64, please delete "particles", and insert therefor --particle--.

Column 7, line 14, after "thereof", please insert --.--.

Column 8, line 40, please delete "31P", and insert therefor --$^{31}P$--.

CERTIFICATE OF CORRECTION (continued)
U.S. Pat. No. 6,960,328 B2

Column 10, Claim 5, line 31, please delete "Zr(HPO$_4$)$_2$.nMe$_x$O.mH$_2$O", and insert therefor --Zr(HPO$_4$)$_2$•nMe$_x$O•mH$_2$O--.

Column 10, Claim 6, line 35, please delete "Zr(HPO$_4$)$_2$.nNa$_2$O.mH$_2$O", and insert therefor --Zr(HPO$_4$)$_2$•nNa$_2$O•mH$_2$O--.

Column 10, Claim 8, line 41, please delete "Zr(HPO$_4$)$_2$.nMe$_x$O.mH$_2$O", and insert therefor --Zr(HPO$_4$)$_2$•nMe$_x$O•mH$_2$O--.

Column 10, Claim 9, line 46, after "exchange", please insert --media comprising a zirconium phosphate--.

Column 10, Claim 9, please delete line 47 in its entirety.

Column 11, Claim 16, line 8, after "ammonia", please insert --and--.

Column 12, Claim 30, line 16, please delete "<", and insert therefor --$\geq$--.

Column 12, Claim 35, line 32, please delete "Zr(HPO$_4$)$_2$.nMe$_x$O.mH$_2$O", and insert therefor --Zr(HPO$_4$)$_2$•nMe$_x$O•mH$_2$O--.

Column 12, Claim 36, line 39, please delete "far", and insert therefor --for--.

Column 12, Claim 37, line 42, please delete "Zr(HPO$_4$)$_2$.nMe$_x$O.mH$_2$O", and insert therefor --Zr(HPO$_4$)$_2$•nMe$_x$O•mH$_2$O--.

Column 12, Claim 37, line 47, please delete "+0.00 1 M", and insert therefor --+0.001 M--.